(12) United States Patent
Trimble et al.

(10) Patent No.: US 6,631,080 B2
(45) Date of Patent: Oct. 7, 2003

(54) SYSTEMS AND METHODS FOR BOOSTING DC LINK VOLTAGE IN TURBINE GENERATORS

(75) Inventors: Daniel Trimble, Los Angeles, CA (US); Robert McConnell, Rancho Palos Verdes, CA (US)

(73) Assignee: Hybrid Power Generation Systems LLC, Los Angeles, CA (US)

( * ) Notice: Subject to any disclaimer, the term of this patent is extended or adjusted under 35 U.S.C. 154(b) by 0 days.

(21) Appl. No.: 09/876,271

(22) Filed: Jun. 6, 2001

(65) Prior Publication Data

US 2003/0048651 A1 Mar. 13, 2003

(51) Int. Cl.[7] .................................................. H02M 5/40
(52) U.S. Cl. ........................................... 363/34; 363/123
(58) Field of Search ................................... 363/125, 131, 363/34, 123; 318/140, 145, 801, 811; 290/32, 52

(56) References Cited

U.S. PATENT DOCUMENTS 4,007,407 A    2/1977    Kranert (List continued on next page.)

FOREIGN PATENT DOCUMENTS

| EP | 0472294 A1 | 7/1991 |
|---|---|---|
| EP | 0858153 A1 | 8/1998 |
| EP | 0901218 A1 | 3/1999 |
| JP | 7298516 | 11/1995 |
| JP | 9051638 | 2/1997 |
| WO | WO 97/09524 | 3/1997 |
| WO | WO 98/25014 | 12/1997 |

OTHER PUBLICATIONS

Wang, K., Dissertation "High–Frequency Quasi–Single–Stage (QSS) Isolated AC–DC and DC–AC Power Conversion," *School of Electrical Engineering, Virginia Polytechnic Institute and State University*, Blacksburg, VA (Nov. 16, 1998).

*Primary Examiner*—Adolf D. Berhane
(74) *Attorney, Agent, or Firm*—Sutherland Asbill & Brennan LLP (57) ABSTRACT

The present invention is directed to an active converter system for a permanent magnetic turbogenerator. A system in accordance with an embodiment of the present invention includes a DC voltage link and a first active converter including a connection for inputting or outputting a three-phase AC voltage to or from, respectively, an AC voltage source, another connection for inputting or outputting a DC voltage from or to said DC voltage link, and at least six selectively switchable first IGBTs, wherein selective switching of the first IGBTs results in a boosted DC voltage. The system further includes a second active converter including a connection for inputting or outputting a three-phase AC voltage to or from, respectively, a permanent magnetic generator, another connection for inputting or outputting a DC voltage to or from said DC voltage link, and at least six selectively switchable second IGBTs, wherein the second active converter is capable of boosting said DC voltage.

6 Claims, 5 Drawing Sheets

U.S. PATENT DOCUMENTS

| | | | |
|---|---|---|---|
| 4,277,692 A | | 7/1981 | Small |
| 4,366,390 A | | 12/1982 | Rathmann |
| 4,730,242 A | * | 3/1988 | Divan .................. 363/37 |
| 4,888,674 A | | 12/1989 | Weibelzahl et al. |
| 4,903,184 A | | 2/1990 | Hirose |
| 4,996,637 A | | 2/1991 | Piechnick |
| 5,017,800 A | | 5/1991 | Divan |
| 5,196,995 A | | 3/1993 | Gulczynski |
| 5,412,557 A | * | 5/1995 | Lauw .................. 363/37 |
| 5,440,179 A | | 8/1995 | Severinsky |
| 5,594,634 A | | 1/1997 | Rajashekara et al. |
| 5,652,485 A | | 7/1997 | Spiegel et al. |
| 5,701,243 A | | 12/1997 | Youn et al. |
| 5,771,161 A | | 6/1998 | Jackson et al. |
| 5,847,912 A | | 12/1998 | Smith et al. |
| 5,855,112 A | | 1/1999 | Bannai et al. |
| 5,903,116 A | | 5/1999 | Geis et al. |
| 5,982,645 A | | 11/1999 | Levran et al. |
| 5,994,872 A | | 11/1999 | Hall |
| 6,020,713 A | | 2/2000 | Geis et al. |
| 6,023,135 A | | 2/2000 | Gilbreth et al. |
| 6,031,294 A | | 2/2000 | Geis et al. |
| 6,055,163 A | | 4/2000 | Wagner et al. |
| 6,072,302 A | | 6/2000 | Underwood et al. |
| 6,972,707 | | 6/2000 | Hochgraf |
| 6,093,975 A | | 7/2000 | Peticolas |
| 6,118,187 A | | 9/2000 | Hepner et al. |
| 6,118,238 A | | 9/2000 | Munro et al. |
| 6,118,678 A | * | 9/2000 | Limpaecher et al. .......... 363/60 |
| 6,128,204 A | | 10/2000 | Munro et al. |

* cited by examiner

Figure 4A   Phase A+ Charging Paths

Figure 4A

Figure 4B   Phase A+ Discharging Paths

SYSTEMS AND METHODS FOR BOOSTING DC LINK VOLTAGE IN TURBINE GENERATORS

BACKGROUND OF THE INVENTION

1. Field of the Invention (Technical Field)

The present invention relates to active inverter/rectifiers and turbine generators.

2. Background Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Turbogenerators discussed herein often comprise a permanent magnet generator. Such permanent magnet turbogenerators typically include a compressor, a gas turbine and a bearing rotor including a permanent magnet generator. A permanent magnet turbogenerator can be utilized to provide electrical power for a wide range of utility, commercial and industrial applications. While an individual permanent magnet turbogenerator may only generate up to approximately 150 kilowatts, powerplants of up to 1 megawatts or greater are possible by linking numerous permanent magnet turbogenerators. Throughout this disclosure, microturbine power generator and permanent magnet turbogenerator are used interchangeably according to the aforementioned general description.

A microturbine power generating or "permanent magnet turbogenerator" system typically includes a turbine, a compressor and an electrical generator. Such a system is disclosed in U.S. Pat. No. 4,754,607, entitled "Power Generating System," to Mackay, issued Jul. 5, 1988. Start-up of a microturbine power generating system requires a power source separate from the turbine itself to rotate the turbine/compressor, such as a battery or flywheel, which may be located within the same structure or enclosure that contains the gas turbine engine. Often, a separate starter motor is used to turn the compressor until the microturbine power generating system is capable of sustaining combustion. Alternatively, the microturbine's electrical generator is used to turn the compressor during startup. When the microturbine's electrical generator is used, a switch/starter control is included to supply an excitation current to stator windings of the electrical generator, which turns the compressor until combustion can be sustained. However, both approaches require an external source of power to operate the starter motor or to supply an excitation current to the stator windings of the electrical generator. A battery or a grid are suitable external sources of power for a starter motor or a switch/starter control.

U.S. Pat. No. 6,046,122, entitled "Microturbine Power of Generating System Including a Battery Source for Supplying Startup Power," to McConnell, issued May 16, 2000 ('122 patent), discloses a system having a battery based starter wherein the battery's DC power is converted to 3 phase AC power suitable for providing an excitation current to the stator windings of a microturbine's electrical generator. The system also has an up chopper for reducing the required output voltage of the battery and a down chopper for converting AC voltage to a DC voltage suitable for charging the battery.

In one embodiment of the '122 patent, the system uses a low voltage battery source and a starter control including a DC link, an inverter and a bidirectional chopper. The bi-directional chopper provides the functionality of both the up chopper and the down chopper. Thus, the bi-directional chopper boosts the voltage from the low voltage battery source and applies the boosted voltage on the DC link. A second inverter converts the power on the DC link to three-phase AC power for startup using the 3 phase rotary machine in a motoring mode. During normal operation of the microturbine power generating system, the down chopper feature of the bi-directional chopper uses rectifier output power (available at the DC link) to charge the low voltage battery source. A duty cycle of 10%, for example, would reduce a rectified voltage of 500 volts to about 50 volts for charging a 48 volt battery. In the event the electric generator experiences a failure during normal operation, the bi-directional chopper can connect the battery source to inputs of a main inverter to provide backup power.

International Application, WO 98/25014, published under the Patent Cooperation Treaty, entitled "Electrical System for Turbine/Alternator on Common Shaft," to Gupta et al., published Jun. 11, 1998, discloses a system that uses a single inverter and mechanical contactors in a start-up and an operational mode. A shaft sensor is also required for start-up operation.

SUMMARY OF THE INVENTION

In one embodiment, the present invention comprises a permanent magnet turbogenerator system comprising a permanent magnet turbogenerator and an active inverter/rectifier. In this embodiment, the active inverter/rectifier comprises an input for inputting a three-phase AC voltage from the permanent magnet turbogenerator, an output for outputting a DC voltage, and at least six insulated gate bipolar transistors (IGBTs), each having a corresponding anti-parallel diode, wherein selective switching of the IGBTs boosts the resulting DC voltage. According to this embodiment, the system optionally allows for output of a boosted DC voltage at a reduced turbine engine speed. Further, this embodiment optionally allows for the output of a boosted DC voltage at a reduced turbine engine speed that results in a higher turbine operating temperature and consequently a turbine operational efficiency that is greater than that achieved for output of an equivalent non-boosted, DC voltage.

In another embodiment, the present invention comprises a starter for starting a permanent magnet turbogenerator comprising a permanent magnet turbogenerator wherein the permanent magnet turbogenerator comprises a shaft connected to a turbine engine; a three-phase AC voltage source; a first active inverter/rectifier that comprises an input for inputting a three-phase AC voltage from the three-phase AC voltage source, an output for outputting a DC voltage to a DC voltage link, and at least six IGBTs, each having a corresponding anti-parallel diode, wherein selective switching of the IGBTs boosts the DC voltage to the DC voltage link; and a second active inverter/rectifier that comprises an input for inputting the DC voltage from the DC voltage link, an AC voltage output, and at least six IGBTs, each having a corresponding anti-parallel diode, wherein selective switching of the IGBTs produces a pulse width modulated AC voltage for output to the permanent magnet turbogenerator and rotating the shaft.

In yet another embodiment, the present invention comprises a battery charger for charging a permanent magnet turbogenerator starter battery. According to this embodiment, the apparatus comprises a three-phase AC voltage source; an active inverter/rectifier that comprises an input for inputting a three-phase AC voltage from the three-phase AC voltage source, an output for outputting a DC voltage to a DC voltage link, and at least six IGBTs, each having a corresponding anti-parallel diode, wherein selective switching of the IGBTs boosts the DC voltage to the DC voltage link; and a permanent magnet turbogenerator starter battery that is chargeable by connection to the DC voltage link. This embodiment optionally comprises a circuit for controlling battery charging as a function of temperature, for example, but not limited to, battery temperature.

One embodiment of the present invention comprises an active inverter/rectifier system for a permanent magnet turbogenerator. In this embodiment, the system comprises a DC voltage link; a first active inverter/rectifier that comprises a connection for inputting or outputting a three-phase AC voltage from or to an AC voltage source, another connection for inputting or outputting a DC voltage from or to a DC voltage link, and at least six selectively switchable IGBTs, each having a corresponding anti-parallel diode, capable of boosting the DC voltage; and a second active inverter/rectifier that comprises a connection for inputting or outputting a three-phase AC voltage from or to a permanent magnet turbogenerator, another connection for inputting or outputting a DC voltage from or to the DC voltage link, and at least six selectively switchable IGBTs, each having a corresponding anti-parallel diode, capable of boosting the DC voltage wherein the boost capability of the first and the second active inverter/rectifiers comprises software controlled switch drivers.

In another embodiment, the present invention comprises an active inverter/rectifier system for a permanent magnet turbogenerator. In this embodiment, the system comprises a DC voltage link; a first active inverter/rectifier that comprises a connection for inputting or outputting a three-phase AC voltage from or to an AC voltage source, another connection for inputting or outputting a DC voltage from or to a DC voltage link, and at least six selectively switchable IGBTs, each having a corresponding anti-parallel diode, capable of boosting the DC voltage; and a second active inverter/rectifier that comprises a connection for inputting or outputting a three-phase AC voltage from or to a permanent magnet turbogenerator, another connection for inputting or outputting a DC voltage from or to the DC voltage link, and at least six selectively switchable IGBTs, each having a corresponding anti-parallel diode, capable of boosting the DC voltage wherein the boost capability of the first and the second active inverter/rectifiers comprises hardware controlled switch drivers.

In yet another embodiment, the invention comprises an active inverter/rectifier system for a permanent magnet turbogenerator. In this embodiment, the system comprises a DC voltage link; a first active inverter/rectifier that comprises a connection for inputting or outputting a three-phase AC voltage from or to an AC voltage source, another connection for inputting or outputting a DC voltage from or to a DC voltage link, and at least six selectively switchable IGBTs, each having a corresponding anti-parallel diode, capable of boosting the DC voltage; and a second active inverter/rectifier that comprises a connection for inputting or outputting a three-phase AC voltage from or to a permanent magnet turbogenerator, another connection for inputting or outputting a DC voltage from or to the DC voltage link, and at least six selectively switchable IGBTs, each having a corresponding anti-parallel diode, capable of boosting the DC voltage wherein the boost capability of the first and the second active inverter/rectifiers comprises software and hardware controlled switch drivers.

Other embodiments comprising a different number of selectively switchable IGBTs and/or anti-parallel diodes are within the scope of the present invention.

A primary object of the present invention is to boost a DC link voltage.

A primary advantage of the present invention is increase operational efficiency of a permanent magnet turbogenerator.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF THE INVENTION

The present invention comprises an active rectifier, in particular, according to various embodiments, an active rectifier for use in a permanent magnet turbogenerator. According to one embodiment, the active rectifier comprises a computer controlled pulse width modulated (PWM) power converter that selectively provides for bi-directional flow of power. For example, in this bi-directional embodiment, one direction of power flow converts a DC link voltage to a 3 phase AC voltage for output to a grid and/or a load while a reverse direction of power flow converts AC voltage from a grid or other voltage source to a DC voltage suitable for starting a turbogenerator and/or charging a battery. In either instance, a circuit is optionally provided that is capable of boosting DC voltage to a level greater than that obtained by a straight rectification circuit.

While several embodiments rely on computer control, e.g., through software, other embodiments rely on discrete circuitry, and/or a combination of both.

Figure 1:
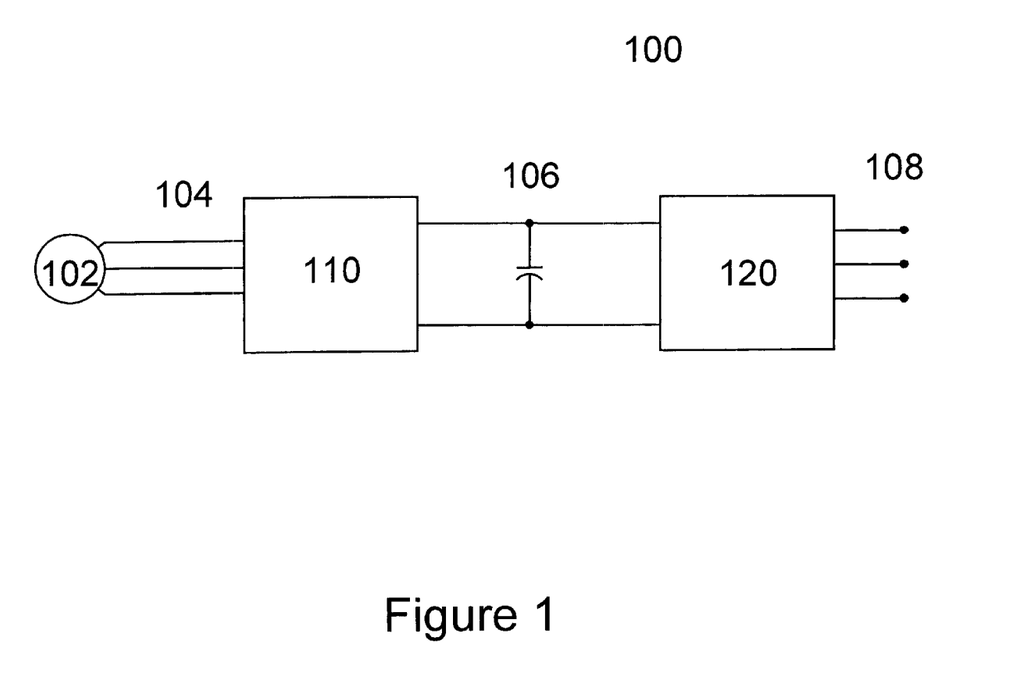
FIG. 1 is a schematic of a Start Inverter and Main Inverter system.

Various embodiments of the present invention represent a substantial improvement over current practice. According to current practice, a dual conversion process 100 is used wherein an AC voltage 104 from a permanent magnet generator (PMG) 102 is converted to a DC link voltage 106 by a first converter (Start Inverter) 110 and then to a constant frequency 3 phase AC voltage 108 by a second converter (Main Inverter) 120, as shown in FIG. 1 During normal power generation, the PMG 102 provides an AC output voltage 104, which is then converted to a DC link voltage 106 by means of a rectifier portion of the Start Inverter 110. The Start Inverter 110 and/or the Main Inverter 120 shown in FIG. 1 optionally comprise insulated gate bipolar transistor (IGBT) inverter bridge circuits that comprise, for example, 6 semiconductor diode rectifier/transistor switch devices. While a PMG rectifier may simply comprise a 6-diode rectifier, according to various embodiments of the present invention, Start and Main Inverters each comprise 6 IGBTs, which are essentially identical in ratings and functional capabilities. Further, each inverter bridge circuit is generally capable of being operated to control power flow in either direction (AC to DC and DC to AC) by means of proper gate signal timing, e.g., determined by respective software control, to effectuate a dual conversion system. Of course, other means of gate control that do not rely on software are also within the scope of the present invention.

Figure 2:
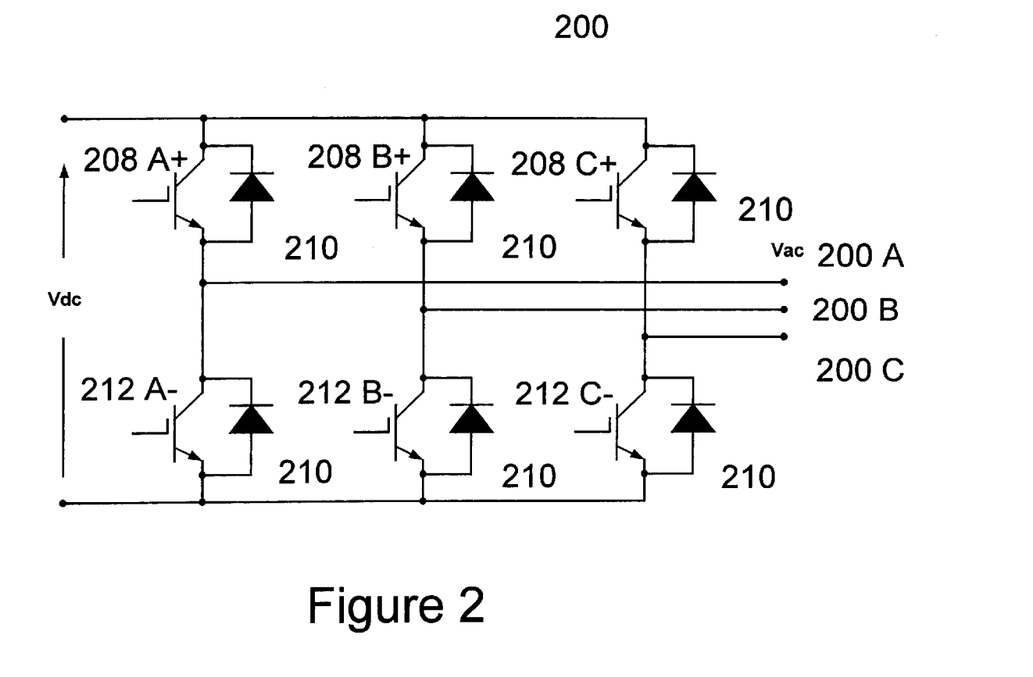
FIG. 2 is a schematic of a PWM inverter having a three-phase AC voltage input.

A 6 IGBT inverter bridge circuit 200 is shown in FIG. 2. This inverter 200 is capable of pulse width modulation (PWM) operation and is thus referred to herein as a PWM inverter. As shown in FIG. 2, the PWM inverter 200 comprises three IGBT channels 202(A), 204(B), and 206(C), wherein, for example, the three channels carry a three-phase (A, B, C) AC voltage. Each IGBT channel 202(A), 204(B), and 206(C) includes an upper IGTB 208(A+, B+, C+) and an anti parallel diode 210 and a lower IGBT 212(A−, B−, C−) and an identical anti parallel diode 210. Thus, each of the three channels comprises two IGBTs for a total of 6 IGBTs. A twin inverter (e.g., Start Inverter/Main Inverter) system implementing PWM inverters of the type shown in FIG. 2 would therefore comprise a total of 12 IGBTs. As described herein, 6 IGBT inverters accepting three-phase AC voltage input, are referred to, in some instances, with respect to A, B, C channels as A+, B+, C+, A−, B−, and C− switches.

For effective use of the PWM inverter 200, control logic is required to drive the IGBT switches (A+, B+, C+, A−, B−, and C−) via, e.g., IGBT gate drives. The six IGBT switches (A+, B+, C+, A−, B−, and C−) in channels 202(A), 204(B), and 206(C) are optionally operated at a high frequency and modulated in classic PWM manner to, for example, convert a DC input voltage to a sinusoidal AC output voltage. This inverter circuit is also capable of operation as an active rectifier for conversion of an AC input voltage to a DC output voltage.

While the aforementioned inverter is useful for both AC to DC and DC to AC conversion, systems that rely on a simple rectifier circuit for AC to DC conversion are known in the art. For example, a PWM inverter that further comprises a simple rectifier is disclosed in U.S. Pat. No. 5,903,116, entitled "Turbogenerator/motor Controller," to Geis, et al., issued May 11, 1999 ('116 patent), which is incorporated herein by reference. According to the '116 patent, the additional rectifier accepts three-phase AC voltage from a PMG and through a six diode element bridge rectifies the AC input voltage to a DC output voltage. Thus, through use of the additional rectifier, the PWM inverter of the '116 patent is capable of operating as a dual function inverter to start a turbine engine via a PMG and to convert PMG output to utility power.

According to various embodiments of the present invention, two PWM inverters, e.g., each as shown in FIG. 2, are used and tied together via a DC link. This particular configuration allows for numerous advantages when compared to, for example, the PWM inverter-additional rectifier system of the '116 patent. Such advantages include, but are not limited to, the ability to boost the DC link voltage before conversion to a useful AC voltage. Of course, inverters that are more sophisticated (e.g., contain additional components) than the inverter of FIG. 2 are also within the scope of the present invention. For example, more sophisticated inverters include the inverter disclosed in the '116 patent, which comprises eight IGBTs wherein the two additional IGBTs function in a power generation mode to form a constant duty fifty percent duty cycle divider to maintain exactly half bus voltage at a center tap point. The center tap point forms a neutral for an AC output. According to the '116 patent, the neutral is not required for generator starting but is required for utility interface.

Referring again to the twin inverter system (Start Inverter/Main Inverter) shown in FIG. 1, the DC to AC capability of the Start Inverter of such twin inverter, dual conversion systems is useful to initially accelerate a PMG to a speed sufficient to start a turbine engine. In this operational mode, the Start Inverter performs a motor drive function by converting the DC link voltage to a variable frequency and variable voltage output wherein both IGBT and parallel rectifiers take part in the operational process. For the case of a turbine engine, once the engine reaches a sufficient speed, the IGBT devices of the Start Inverter are all switched via their respective gate signals to an "off" state. In turn, high frequency AC voltage generated by the turbine-driven PMG is then converted to a DC voltage by the Start Inverter rectifiers. The DC link voltage is then converted to a fixed frequency AC voltage by the Main Inverter, which is optionally voltage or current regulated. Typically, the Main Inverter is operated at a fixed frequency of 50 Hz or 60 Hz, depending on use, e.g., external load or loads or a utility grid.

Traditional inverter circuits and inverter control methods impose undesirable operating limitations on a microturbine power generator. For example, simple rectifier operation of a Start Inverter (AC to DC) for power generation requires the turbine engine to be maintained at relatively high speeds even with light loads to maintain sufficient DC link voltage to maintain a sufficient Main Inverter (DC to AC) output voltage. In other words, a minimum DC link voltage is needed to produce a practical, useable Main Inverter AC output voltage. This minimum DC link voltage imposes an undesirable limitation on the turbine's speed, which, in turn, often results in inefficient turbine engine operation. Thus, a need exists to de-couple and/or reduce DC link voltage dependence on turbine speed. Various embodiments of the present invention address this need by operating the Start Inverter as an active rectifier as opposed to a simple rectifier.

According to various embodiments of the present invention, the Start Inverter is operated as an active rectifier to boost DC link voltage. Active rectifier Start Inverter operation thus allows for operation of turbine generators at speeds less than speeds required by conventional simple rectifier Start Inverters (or Start Inverters operated as simple rectifiers). Active rectification is achieved, for example, but not limited to, by proper gating of the IGBT devices.

In another embodiment, the invention comprises the ability to boost DC link voltage in response to sudden power demands due to, for example, increased loads. In this embodiment, the boost capability provides an output voltage that is greater than the normal output voltage of the permanent magnet turbogenerator, i.e., non-boosted voltage output. This embodiment is similar in operation to the aforementioned embodiment that allows the permanent magnet turbogenerator to operate at lower speeds to achieve higher efficiency.

According to other embodiments of the present invention, the Main Inverter is operated to convert an AC voltage (e.g., grid voltage) to a boosted DC link voltage. The increased DC link voltage is suitable for use in charging batteries, or other uses, for example, when the turbine generator is not operating. Where the DC link voltage is controlled for charging a battery, the system optionally comprises an additional circuit that controls, for example, battery current as a function of battery temperature. Alternatively, the DC link voltage boost capability of the Main Inverter is suitable for starting a turbine engine from a relatively low AC voltage source.

Thus, the present invention comprises use of Start Inverters and/or Main Inverters that are capable of boosting DC link voltage. In several embodiments, no hardware changes are required of existing Start and Main Inverter hardware wherein the IGBTs of both are software controllable. In such embodiments, software control algorithms are used to achieve boost functionality of Start Inverters and/or Main Inverters.

Figure 3A:
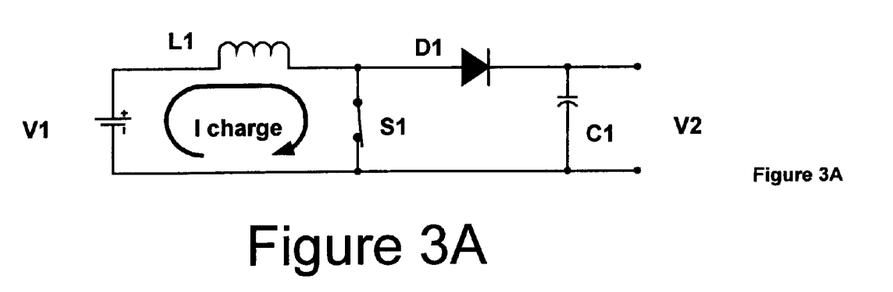
FIG. 3A is a schematic of a circuit for increasing current through an inductor.
Figure 3B:
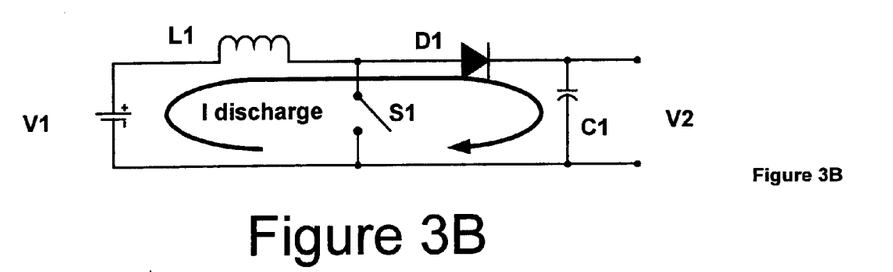
FIG. 3B is a schematic of a circuit for discharging current to charge a capacitor.
Figure 3C:
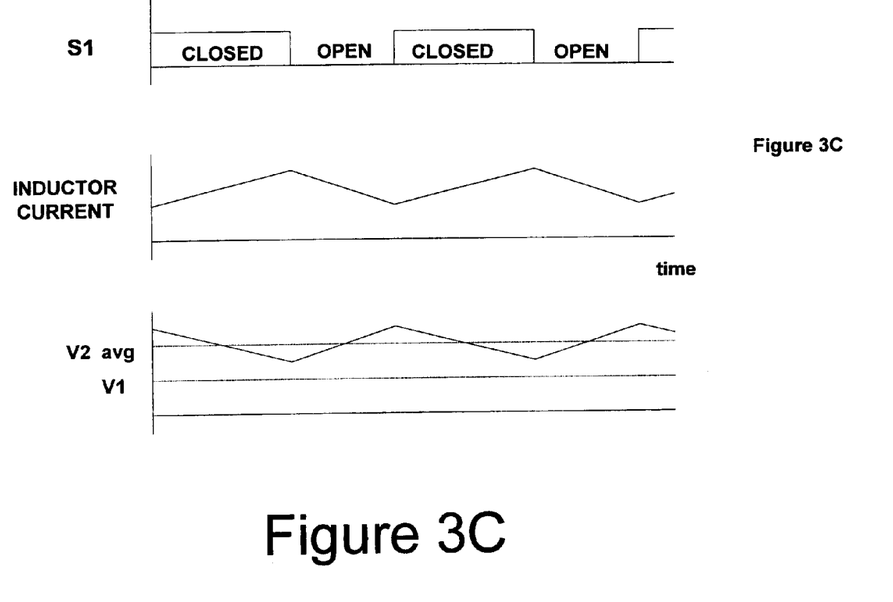
FIG. 3C is a series of plots of switch position versus time (upper), inductor current versus time (middle) and voltage versus time (lower) corresponding to operation of the circuits shown in FIG. 3A and FIG. 3B.

A method for boosting voltage with power electronics is explained with reference to a simple example, as shown in FIGS. 3A, 3B and 3C. In FIG. 3A, the circuit diagram shows a voltage source, V1, supplying a current that flows through a series inductor L1 and a closed switch S1 (gated on). In the circuit shown in FIG. 3A, all of the applied voltage is across the inductor and the current increases at a rate of dI/dT= V1/L1. At the end of a closed time interval, the switch S1 is gated off and the circuit shown in FIG. 3B results. Since the inductor has an initial current level when switch S1 is gated off (i.e., opened), the inductor voltage will rise until the sum of V1 and voltage across L1 exceed V2. At that level, current will flow into the output capacitor, which will then begin charging to a higher level.

Waveforms for the boost operation described above, see also FIGS. 3A and 3B, are shown in FIG. 3C. Referring to FIG. 3C (lower plot of voltage versus time), the source voltage, V1, is essentially boosted to the level of V2. Operation of switch S1 is also shown in FIG. 3C (upper plot of gate status versus time) along with inductor current (middle plot of inductor current versus time). Without considering circuit losses, the average output current will be decreased by the same factor as the voltage is increased. Effectively the circuit described herein operates as a DC transformer. By proper setting of modulation frequency and pulse width, the current and voltage ripples can be held to acceptable levels while achieving reasonable voltage boosts at the output.

Figure 4A:
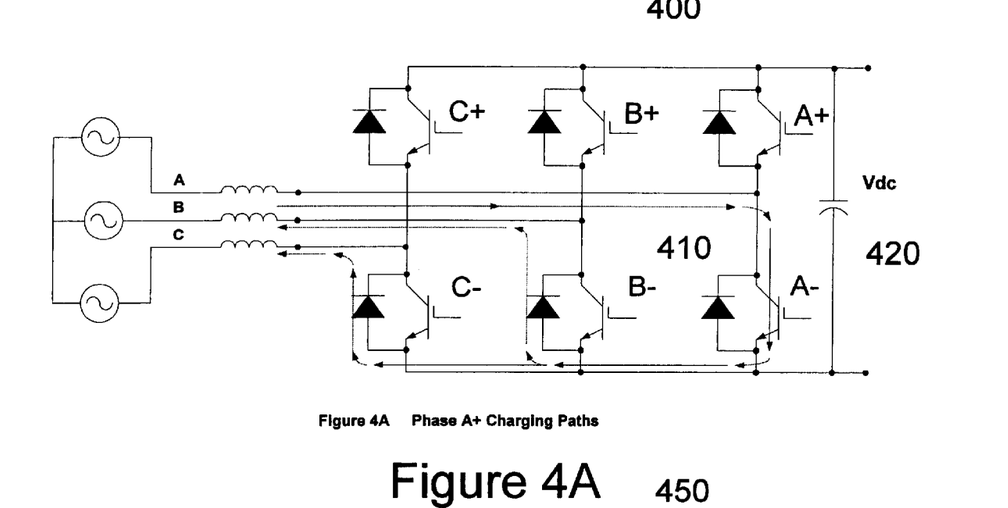
FIG. 4A is a schematic of an inverter showing charging paths.
Figure 4B:
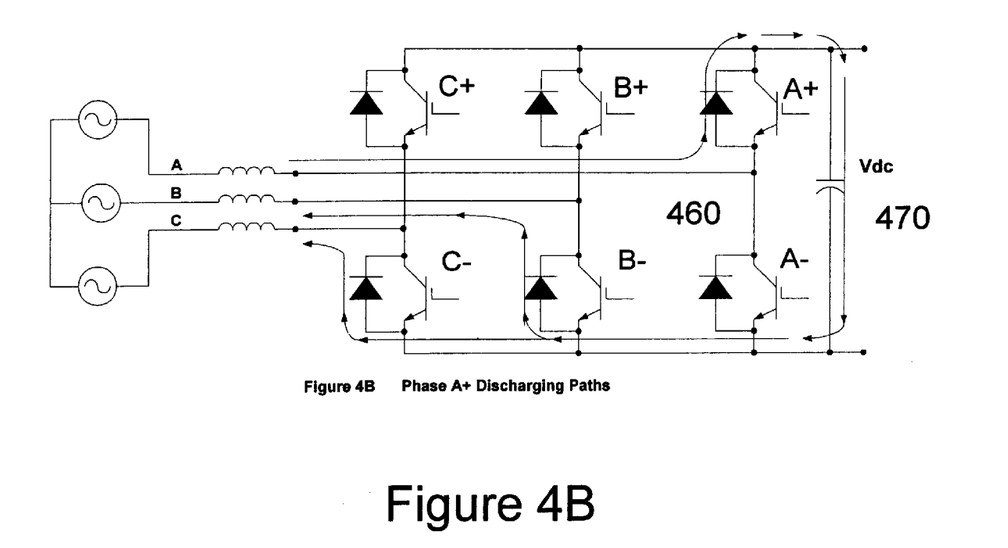
FIG. 4B is a schematic of the inverter of FIG. 4A showing discharging paths.

The operational scheme described above (see FIGS. 3A, 3B and 3C) is applicable to a 3 phase inverter bridge with a similar result of boosting the resulting DC link voltage from a 3 phase voltage source. As shown in FIGS. 4A and 4B, for the positive ½ cycle, charging inductor current will be drawn from the highest phase voltage and returned through the lower phase voltages during the charging interval and will be conducted to the DC link through the upper rectifier of the inverter pole. This same process can be shared by all of the bridge circuit devices by proper sequencing of the device gating signals.

Figure 5A:
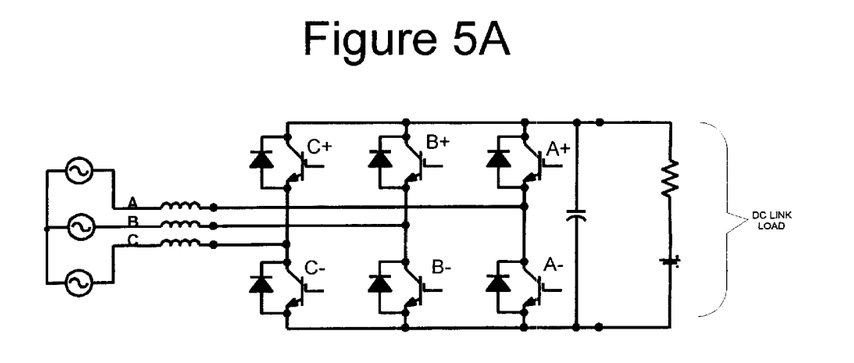
FIG. 5A is a schematic of a PWM inverter suitable for use in various embodiments of the present invention.

The preceding examples illustrate how the process of building up a current within an inductor and then switching to an alternate discharge path can produce an AC to DC converter with a controllable voltage boost. This process is suitable for use in a 3 phase operation, as illustrated in FIGS. 4A and 4B. FIG. 4A shows an IGBT containing circuit 400 and an inductor current charging path 410 for the time interval when phase A is higher than B or C phases. Also shown in FIG. 4A is a DC voltage link 420. The A+, B+, C+, A−, B−, and C− switches are also shown in FIG. 4A. The A− switch can be used as the pulse width modulation (PWM) device to increase the current level to a controlled value. FIG. 4B shows the IGBT containing circuit 450 of FIG. 4A and a discharge path 460, which results from holding the A− device switch in an off state. This causes the inductor current to be transferred to the output capacitor or load across the DC voltage link 470. Another similar IGBT circuit is shown in FIG. 5A. In FIG. 5A, the individual diode/switch devices are, as in FIG. 4A, labeled A+, A−, B+, B−, C+, and C−, corresponding to phases A, B, and C.

Figure 5B:
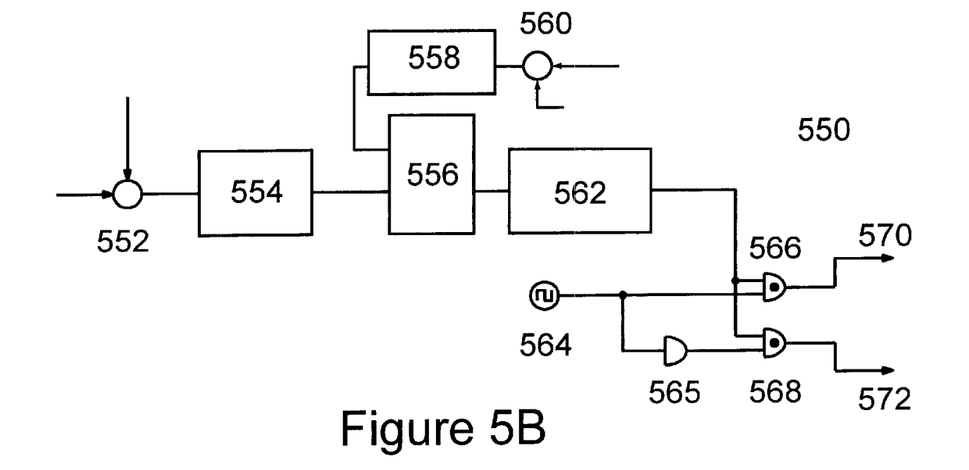
FIG. 5B is a schematic of a controller according to an embodiment of the present invention for controlling a PWM inverter such as the PWM inverter shown in FIG. 5A.

FIG. 5B shows a schematic diagram of a controller 550 for controlling signals to inverter gates. According to this controller embodiment, a DC link reference voltage is compared to a DC link feedback voltage 552, and the result thereof input to a voltage regulator 554. In a similar manner, a feedback current is compared to a reference limit current 560, and the result thereof input to a current regulator 558. Outputs from the current regulator 558 and the voltage regulator 554 are input to a Low Wins 556. The Low Wins 556 outputs the amplitude of the lower amplitude input to be used as the control signal for the pulse width modulator 562. The pulse width modulator 562 outputs a signal that is input to a first NAND gate 566 and a second NAND gate 568. Also input to the first and second gates 566, 568 is a signal from a modulation frequency generator 564. However, the input to the second gate 568 is first passed through a NOT gate (inverter) 565. The output of the first NAND gate 566 drives positive gate drivers 570 while the output of the second NAND gate 568 drives negative gate drivers 572.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An active converter system for a permanent magnetic turbonerator, said system comprising:

a DC voltage link;

a first active converter including a connection for inputting or outputting a three-phase AC voltage to or from, respectively, an AC voltage source, another connection for inputting or outputting a DC voltage from or to said DC voltage link, and at least six selectively switchable first IGBTs, wherein selective switching of the first IGBTs results in a boosted DC voltage; and a second active converter including a connection for inputting or outputting a three-phase AC voltage to or from, respectively, a permanent magnetic generator, another connection for inputting or outputting a DC voltage to or from said DC voltage link, and at least six selectively switchable second IGBTs, wherein the second active converter is capable of boosting said DC voltage.

2. The system of claim 1, wherein the first and second active converters comprise switch drivers controlled by software.

3. The system of claim 2, wherein the software controlled switch drivers comprise software-controlled gate signal timing.

4. The system of claim 2, further comprising a modulation frequency generator operably linked to the software controlled switch driver.

5. The system of claim 1, wherein the first and second active converters further comprise switch drivers controlled by hardware.

6. The system of claim 1, wherein the first and second active converters further comprise switch drivers controlled by hardware and software.

\* \* \* \* \*